United States Patent [19]

Takagi

[11] Patent Number: 4,568,979
[45] Date of Patent: Feb. 4, 1986

[54] TELEVISION RECEIVER MUTING APPARATUS

[75] Inventor: Kotaro Takagi, Tokyo, Japan

[73] Assignee: Sony Corporation, Tokyo, Japan

[21] Appl. No.: 589,339

[22] Filed: Mar. 14, 1984

[30] Foreign Application Priority Data

Mar. 18, 1983 [JP] Japan .............................. 58-38279[U]

[51] Int. Cl.$^4$ .......................... H04N 3/24; H04N 5/44
[52] U.S. Cl. ...................................... 358/165; 358/188
[58] Field of Search ................ 358/165, 160, 181, 188

[56] References Cited

U.S. PATENT DOCUMENTS 3,079,462  2/1963  Rosenthal .......................... 358/165
4,229,765  10/1980  Sanger .................................. 358/165

Primary Examiner—James J. Groody
Assistant Examiner—David E. Harvey
Attorney, Agent, or Firm—Lewis H. Eslinger; Alvin Sinderbrand

[57] ABSTRACT

A television receiver can be used both to generate a picture and sound from a broadcast video signal or to generate just a picture from a locally produced video signal, such as one provided by a video camera. A muting apparatus suppresses the sound generated from the broadcast video signal while the television receiver is used as a monitor for the locally produced video signal. The muting apparatus comprises a level shifter that raises the level of the broadcast video signal. A switching means provides to the picture tube of the television receiver either the broadcast video signal or, if the video camera is plugged into the receiver, the locally produced video signal. The level of the signal supplied to the picture tube is sensed; if it is below the predetermined level a muting means connects the audio component of the broadcast video signal to ground to prevent sound from being generated while the receiver is used as a monitor.

19 Claims, 1 Drawing Figure ing and the detailed description of a preferred embodiment of the invention that follows.

TELEVISION RECEIVER MUTING APPARATUS

BACKGROUND OF THE INVENTION

1. Field of the Invention

The present invention relates to a television receiver and, more particularly, to a muting apparatus for a television receiver that suppresses the sound generated from a first video signal while the receiver is showing a picture generated from a second video signal.

2. Description of the Prior Art

The picture being recorded by a video camera cannot be seen directly, so the video signal generated by the camera is typically fed to a television picture tube to be monitored. The picture tube in a conventional television receiver can be conveniently used for that purpose.

Conventional television receivers include both a video system and a sound system. The receiver picks up broadcast video signals, which include a video component and an audio component, and the video and sound systems of the receiver generate a television picture and its accompanying sound from the respective components of the broadcast signal.

When the television receiver is used as a video camera monitor, the locally produced video signal from the camera is supplied to the receiver's video system rather than the broadcast video signal. The audio component of the received video signal continues to generate sound, but of course that sound does not correspond to the television picture being generated from the camera-supplied video signal. The only known solution to this picture-sound mismatch is to turn down the volume of the sound whenever the receiver is used as a monitor for the video camera.

SUMMARY OF THE INVENTION

It is an object of the present invention to overcome the shortcomings of the prior art.

It is another object of the present invention to provide a muting apparatus that suppresses the sound generated by the television receiver in response to a first video signal when the television receiver is generating a picture in response to a second video signal.

It is a further object of the present invention to provide a television receiver having a muting apparatus that suppresses the sound generated in response to a broadcast video signal when the receiving apparatus is used as a video camera monitor.

In accordance with an aspect of the present invention a muting apparatus is provided for a television receiver which includes a television picture generating means for generating a television picture and sound generating means for generating sound from the respective video and audio components of a video signal. The muting apparatus comprises switching means for accepting first and second video signals and selectively providing one of them to the television picture generating means as a switch output, tagging means for providing the first video signal with a predetermined property absent from the second video signal, and muting means for detecting the predetermined property in the switch output and suppressing the sound generated by the sound generating means in response to detection of the absence of the predetermined property in the switch output.

Other objects, features and advantages of the present invention will be apparent when considering the draw-

DETAILED DESCRIPTION OF PREFERRED EMBODIMENT

Figure 1:
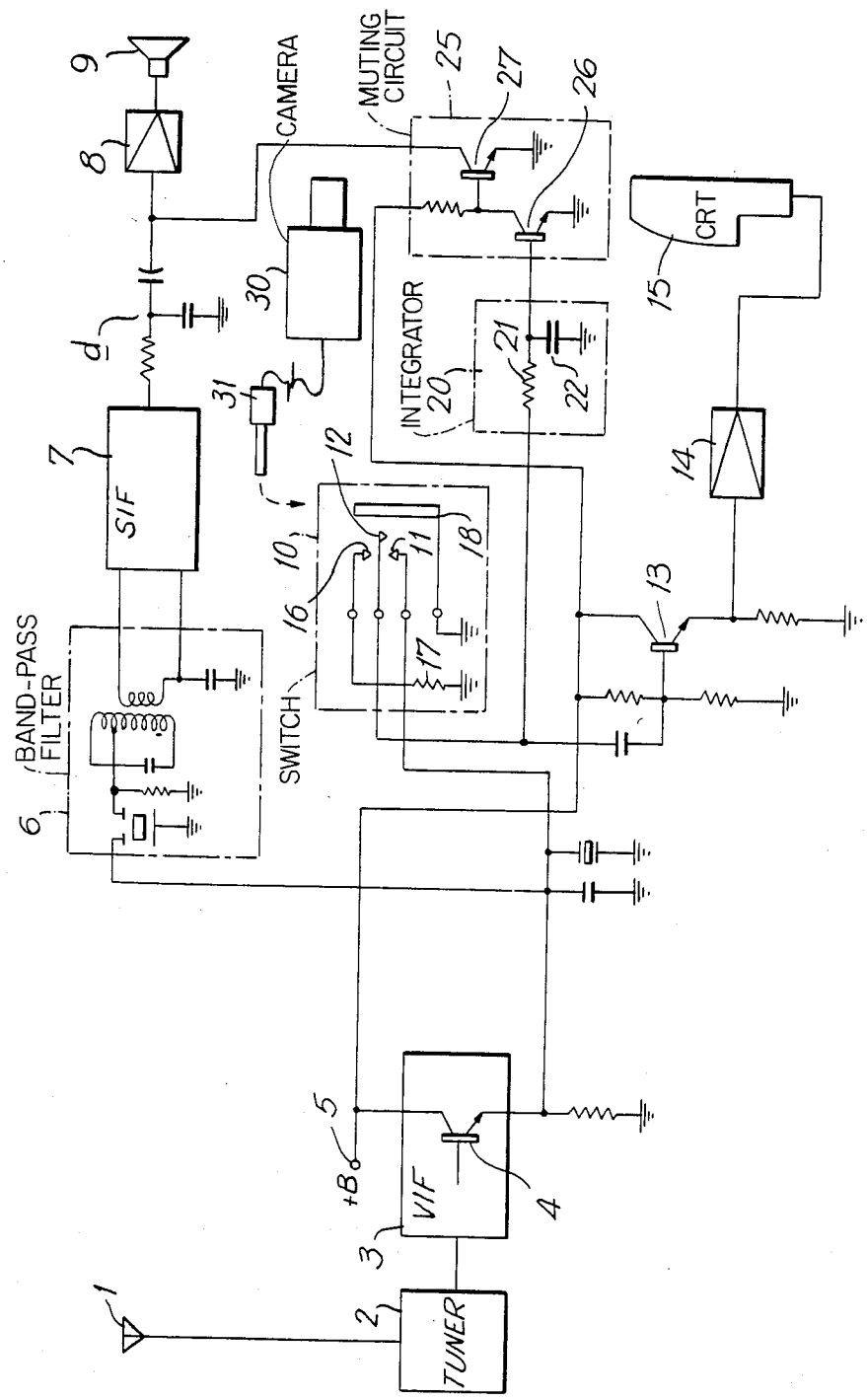
FIG. 1 is a schematic illustration of a television receiver including a muting apparatus in accordance with the present invention.

FIG. 1 shows a monochromatic, or black and white, television receiver. An antenna 1 picks up broadcast video signals, which include a video component and an audio component. A tuner 2 converts the video signal to an intermediate frequency and provides it to a video intermediate-frequency (VIF) amplifier 3. The VIF amplifier 3 includes a transistor 4, the base of which accepts the broadcast video signal. A reference terminal 5 provides direct current at a reference level +B to the transistor 4, the output of which thus comprises the broadcast video signal shifted upwardly to a predetermined level.

The broadcast video signal is supplied to a bandpass filter 6 which separates the audio component from the broadcast video signal and supplies it to a sound intermediate-frequency (SIF) amplifier and demodulator 7. The filter 6 and the amplifier-demodulator 7 comprise an audio generating means that produces an audio signal. The audio generating means provides the audio signal to a transducer means which converts the audio signal into sound. The transducer means includes an audio amplifier 8 and speaker means 9 which generate the sound portion of the broadcast video signal corresponding to the picture to be generated from the video component of the broadcast video signal. A de-emphasis circuit d is provided between the amplifiers 7 and 8 to decrease the high frequency component of the audio signal.

The level-shifted broadcast video signal from the transistor 4 is also supplied to a switching means 10 at an input terminal 11 thereof. The switching means 10 also includes an output terminal 12 connected to the base of a transistor buffer amplifier 13. The output of the buffer-amplifier 13 is connected to a video amplifier 14, the output of which is connected to a cathode ray tube (CRT) 15 comprising the picture tube of the apparatus.

The switching means 10 also includes a ground terminal 16 that is connected to ground through a resistor 17 having a suitable resistance such as 75 ohms. A plug terminal 18 is also connected to ground.

The output terminal 12 is also connected to an integrating circuit 20 comprising a resistor 21 and a capacitor 22. The integrating circuit 20 provides an output the level of which depends on the direct current level of the signal supplied to it. The values of the resistor 21 and the capacitor 22 are chosen so that (1) the time constant of the integrating circuit 20 is large enough to smooth the signal supplied to it, and thus provide an output indicative of the level of the input signal, (2) the input impedance of the integrating circuit 20 is high enough to have little or no influence on the video amplifier 14 and (3) the level of the output of the integrating circuit 20 will be large enough for its intended purpose, which is described below. Typical values are 75,000 ohms for the resistor 21 and, for the capacitor 22, 22 microfarads.

The output of the integrating circuit 20 is supplied to a muting circuit 25 comprising a control transistor 26 and a grounding transistor 27. The base of the control transistor 26 accepts the output of the integrating circuit 20. The collector of the control transistor 26 is connected to the base of the grounding transistor 27 and to the amplifier terminal 5. When the output of the integrating circuit 20 is above a certain level, the base of the grounding transistor 27 is connected to ground through the control transistor 26. Otherwise, the base of the grounding transistor 27 is maintained at the reference level +B.

The collector of the grounding transistor 27 is connected between the SIF amplifier-demodulator 7 and the audio amplifier 8. When the base of the grounding transistor 27 is at a sufficiently high level, the output of the SIF amplifier-demodulator 7 is grounded and no sound is generated by the speaker means 9.

A video camera 30 is used to generate a local video signal. A plug means 31 connects to the switching means 10 to provide the local video signal generated by the camera 30 to the receiver when the plug means 31 is inserted into the switching means 10.

The television receiver shown in FIG. 1 operates as follows.

The switching means 10 provides the signal at the input terminal 11 to the output terminal 12 if the plug means 31 is not plugged into the switching means 10. If the plug means 31 from the video camera 30 is plugged into the switching means 10, the input terminal 11 is connected to the ground terminal 16 and the broadcast video signal is fed to ground. The plug terminal 18 connects the ground lead of the plug means 31 to ground while the local video signal is provided to the output terminal 12 of the switching means. The switching means 10 thus selectively provides as a switch output either a first video signal (here the received signal) or a second video signal (here the local video signal from the camera 30).

The first, or received, video signal also has an audio component that the filter 6, amplifier-demodulator 7 and de-emphasis circuit d convert into the audio signal. The audio amplifier 8 and the speaker means 9 convert the audio signal into sound.

When no plug means is inserted into the switching means 10, the first video signal is provided to the picture tube 15 and to the integrating circuit 20. The direct current level of the switch output in this mode of operation is sufficiently high that the output of the integrating circuit 20 turns "on" the control transistor 26. The base of the grounding transistor 27 is thus grounded, which turns the grounding transistor 27 "off". The audio amplifier 8 thus receives the audio signal and the receiving apparatus generates a television picture and the sound corresponding to it from the video and audio components of the broadcast video signal.

When the plug means 31 is plugged into the switching means 10, the first video signal is supplied to ground through the terminal 16 and the local video signal is supplied through the terminal 12 as the switch output. The local video signal is then used to generate a television picture on the CRT 15.

The direct current level of the switch output supplied to the integrating circuit 20 is lower than the level of the broadcast video signal because the level of the latter is raised by the transistor 4 to a predetermined level above that of the local video signal. Thus, the output of the integrating circuit is too low to maintain the control transistor 26 "on". The base of the grounding transistor 27 receives the reference level +B. The grounding transistor 27 is turned "on", which connects the audio amplifier 8 to ground and suppresses the generation of sound from the audio signal.

The result is that a local video signal from a video camera can be monitored on the CRT 15 while no sound is heard from the speaker means 9.

The present invention thus provides a tagging means for providing the broadcast video signal with a predetermined property absent from the local video signal. In the embodiment shown that property is an increased direct current level, but those skilled in the art will recognize that other means of identifying the broadcast video signal can be used. The integrating circuit 20 and the muting circuit 25 comprise a muting means that detects that property in the switch output and suppresses the sound generated by the receiver when that property is absent in the switch output. In the present embodiment the muting circuit acts as a grounding means that connects the audio component of the broadcast video signal to ground when the predetermined is not detected in the switch output.

The receiver and the video camera together comprise a television recording and monitoring apparatus that can generate a picture and sound from a broadcast video signal and that can generate a picture from the local video signal generated by the video camera while suppressing the sound produced from the broadcast video signal.

Prior art television receivers are known to include means for raising the direct current level of a broadcast video signal. It is also known to use the pedestal level of the video signal provided by a video camera to provide a direct current level for that signal lower than the level of the broadcast video signal. But no known receiver provides a muting apparatus that suppresses the generation of sound when a locally produced video signal is being used to generate a television picture. It will also be clear to those skilled in the art that the present invention is useful even if the locally produced video signal is supplied to the audio circuitry of the receiver. Even though that video signal has no audio component, the present invention prevents the generation of unwanted noise.

Although a specific embodiment of the invention has been described in detail herein with reference to the accompanying drawing, it is to be understood that the invention is not limited to that embodiment, and that various changes and modifications, other than those specifically mentioned, can be effected therein by one skilled in the art without departing from the scope or spirit of the invention as defined in the appended claims.

What is claimed is:

1. A muting apparatus for a television receiver including television picture generating means for generating a television picture and sound generating means for generating sound from the respective video and audio components of a video signal, the apparatus comprising:

switching means for accepting first and second video signals and selectively providing to the television picture generating means one of the video signals as a switch output;

tagging means for providing the first video signal with a predetermined property absent from the second video signal; and muting means for detecting said predetermined property in said switch output and suppressing the sound generated by the sound generating means in response to detection of the absence of said predetermined property in said switch output.

2. Muting apparatus as in claim 1; wherein:
the first video signal is a broadcast video signal having a video component and an audio component and the second video signal is generated by a video camera having plug means for connection to said switching means; and
said switching means provides the second video signal as said switch output when the plug means of the video camera is connected to said switching means.

3. Muting apparatus as in claim 1; wherein said tagging means includes level shifting means for providing the broadcast video signal to said switching means at a predetermined level above the level of the second video signal.

4. Muting apparatus as in claim 3; wherein said muting means comprises:
detecting means for detecting the level of said switch output; and
a grounding circuit for connecting the audio component of the first video signal to ground in response to detection by said detecting means that said level of said switch output is below said predetermined level.

5. Muting apparatus as in claim 4; wherein said detecting means comprises an integrating circuit.

6. Muting apparatus as in claim 5; wherein said integrating circuit comprises a resistor and a capacitor connected between ground and said resistor.

7. Muting apparatus as in claim 5; wherein said grounding circuit includes:
a grounding transistor for providing a current path to ground for the audio component of the first video signal when the base thereof is at a reference level; and
a control transistor having its base connected to said integrating circuit for providing a current path to ground for the base of said grounding transistor when the base of said control transistor is at said predetermined level, wherein the current path to ground through said grounding transistor is interrupted by maintaining the base thereof below said reference level when said switch output is at said predetermined level.

8. A television receiving apparatus for selectively providing a first television picture and sound corresponding thereto from the respective video and audio components of a first video signal and a second television picture from a second video signal while suppressing the sound corresponding to the first television picture, the apparatus comprising:
switching means for accepting the first and second video signals and selectively providing as a switch output one of the video signals;
television picture generating means for generating one of said television pictures in response to said switch output;
sound generating means for generating sound in response to the audio component of the first video signal;
level shifting means for providing the first video signal to said switching means at a predetermined level above the level of the second video signal; and
muting means for detecting the level of said switch output and suppressing the sound generated by said sound generating means when said switch output is below said predetermined level.

9. A television receiving apparatus as in claim 8; wherein:
the first video signal is a broadcast signal and the second video signal is generated without an audio component by a video camera having a plug means for connection to said switching means; and
said switching means provides the second video signal as said switch output when the plug means of the video camera is connected to said switching means.

10. A television receiving apparatus as in claim 9; wherein:
said sound generating means includes audio generating means for generating an audio signal from the first video signal supplied thereto and transducer means for accepting said audio signal from said audio generating means and converting said audio signal to sound; and
said muting means connects said audio signal to ground when said switch output is below said predetermined level.

11. Television receiving apparatus as in claim 10; wherein said muting means includes:
detecting means for detecting the level of said switch output; and
a grounding circuit connected to said audio generating means for providing a current path to ground in response to detection by said detecting means that said level of said switch output is below said predetermined level.

12. Television receiving apparatus as in claim 8; wherein said muting means includes:
an integrating circuit for detecting the level of said switch output, said integrating circuit having an input impedance with a value that substantially prevents influence of said integrating circuit on said television picture generating means; and
a grounding circuit for connecting the audio component of the first video signal to ground in response to the output of said integrating circuit.

13. Television receiving apparatus as in claim 12; wherein said integrating circuit comprises a resistance of about 75,000 ohms and a capacitance of about 22 microfarads connected between said resistance and ground.

14. Television receiving apparatus as in claim 12; wherein said level shifting means comprises a video intermediate-frequency amplifier and a direct current source for increasing the level of the first video signal to said predetermined level.

15. Television receiving apparatus as in claim 14; wherein said grounding circuit includes:
a grounding transistor having its base connected to said direct current source for providing a current path for connecting the audio component of the first video signal to ground when said base is at the level of said direct current source; and
a control transistor having its base connected to said integrating circuit for providing a current path to ground for the base of said grounding transistor when said switch output is at said predetermined level.

16. A television recording and monitoring apparatus comprising a video camera means for generating a local video signal and including a plug means for carrying the local video signal externally of said camera and a television receiving apparatus for receiving a broadcast video signal having a video component and an audio component and providing a television picture and sound corresponding thereto from said respective video and audio components of the broadcast video signal, wherein said receiving apparatus includes:

level shifting means for providing the broadcast video signal at a predetermined level above the level of the local video signal;

switching means for selectively providing one of the level-shifted broadcast video signal and the local video signal as a switch output for use in providing the television picture, wherein said switching means accepts said plug means and provides the local video signal as said switch output upon acceptance of said plug means; and muting means for suppressing the sound provided by the receiving apparatus when said switch output is below said predetermined level.

17. Television recording and monitoring apparatus as in claim 16; wherein:

said receiving apparatus includes a television picture generating means for generating a television picture in response to said switch output and a sound generating means for generating sound in response to the audio component of the broadcast video signal; and said muting means includes a detecting means for detecting the level of said switch output and grounding means for connecting the audio component of the broadcast video signal to ground in response to detection by said detecting means that said level of said switch output is below said predetermined level.

18. Television recording and monitoring apparatus as in claim 17; wherein said detecting means comprises an integrating circuit.

19. Television recording and monitoring apparatus as in claim 17; wherein said television picture generating means generates a monochromatic televison picture.

* * * * *